United States Patent
Koskela et al.

(10) Patent No.: US 9,485,709 B2
(45) Date of Patent: Nov. 1, 2016

(54) DETERMINISTIC USER EQUIPMENT BARRING

(71) Applicant: Nokia Technologies Oy, Espoo (FI)

(72) Inventors: Jarkko Koskela, Oulu (FI); Woonhee Hwang, Espoo (FI)

(73) Assignee: Nokia Technologies Oy, Espoo (FI)

( * ) Notice: Subject to any disclaimer, the term of this patent is extended or adjusted under 35 U.S.C. 154(b) by 155 days.

(21) Appl. No.: 14/364,667

(22) PCT Filed: Dec. 18, 2012

(86) PCT No.: PCT/FI2012/051256
§ 371 (c)(1),
(2) Date: Jun. 11, 2014

(87) PCT Pub. No.: WO2013/093192
PCT Pub. Date: Jun. 27, 2013

(65) Prior Publication Data
US 2014/0307720 A1 Oct. 16, 2014

Related U.S. Application Data

(60) Provisional application No. 61/577,195, filed on Dec. 19, 2011.

(51) Int. Cl.
*H04W 48/02* (2009.01)
(52) U.S. Cl.
CPC .................................. *H04W 48/02* (2013.01)
(58) Field of Classification Search
CPC ... H04W 48/04; H04W 48/06; H04W 48/00; H04W 48/16; H04W 48/17; H04W 48/18; H04W 48/12

USPC ........................................................ 370/336
See application file for complete search history.

(56) References Cited

U.S. PATENT DOCUMENTS

| | | | | |
|---|---|---|---|---|
| 2009/0270104 | A1* | 10/2009 | Du | H04W 48/02 455/436 |
| 2010/0157919 | A1* | 6/2010 | Koskinen | H04W 72/005 370/329 |
| 2010/0184448 | A1 | 7/2010 | Wu | |
| 2011/0199905 | A1* | 8/2011 | Pinheiro | H04W 4/005 370/235 |
| 2011/0274040 | A1* | 11/2011 | Pani | H04W 4/005 370/328 |

(Continued)

OTHER PUBLICATIONS

International Search Report and Written Opinion recieved for corresponding Patent Cooperation Treaty Application No. PCT/FI2012/051256 , dated Dec. 18, 2012, 11 pages.

(Continued)

*Primary Examiner* — Chi H Pham
*Assistant Examiner* — Robert Lopata
(74) *Attorney, Agent, or Firm* — Mintz Levin Cohn Ferris Glovsky and Popeo, P.C.

(57) ABSTRACT

According to an example embodiment, there is provided a method comprising determining a barring class to which a user equipment belongs, and determining a value for a barring timer, wherein determining the value for a barring timer uses a value derived from a system frame number, SFN, in which the user equipment received an access barring parameter. The method may further comprise initializing the barring timer to the determined value, starting the barring timer and determining, while the barring timer is running, whether a group of user equipment to which the user equipment belongs is barred.

18 Claims, 6 Drawing Sheets

(56) References Cited

U.S. PATENT DOCUMENTS

| | | | | |
|---|---|---|---|---|
| 2011/0294508 | A1* | 12/2011 | Min | H04W 36/0083 455/436 |
| 2012/0287851 | A1* | 11/2012 | Lee | H04W 48/02 370/328 |
| 2013/0303162 | A1* | 11/2013 | Iwamura | H04W 48/02 455/433 |
| 2013/0331099 | A1* | 12/2013 | Iwamura | H04W 48/02 455/434 |
| 2014/0171061 | A1* | 6/2014 | Larmo | H04W 74/006 455/422.1 |
| 2014/0321416 | A1* | 10/2014 | Pragada | H04W 88/04 370/329 |
| 2014/0329503 | A1* | 11/2014 | Deng | H04W 48/02 455/411 |

OTHER PUBLICATIONS

LTE; Evolved Universal Terrestrial Radio Access (E-UTRA); Radio Resource Control (RRC); Protocol specification (3GPP TS 36.331 version 8.15.0 Release 8) pp. 31-36.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300, v10.5.0, Sep. 2011, pp. 1-194.

"3rd Generation Partnership Project; Technical Specification Group Radio Access Network; Requirements for Further Advancements for Evolved Universal Terrestrial Radio Access (E-UTRA) (LTE-Advanced) (Release 10)", 3GPP TR 36.913, v10.0.0, Mar. 2011, pp. 1-15.

"3rd Generation Partnership Project; Technical Specification Group Radio Access Network; Feasibility Study for Further Advancements for E-UTRA (LTE-Advanced) (Release 10)", 3GPP TR 36.912, v10.0.0, Mar. 2011, pp. 1-62.

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331, v10.3.0, Sep. 2011, pp. 1-296.

"3rd Generation Partnership Project; Technical Specification Group Radio Access Network; Evolved Universal Terrestrial Radio Access (E-UTRA); User Equipment (UE) Radio Transmission and Reception (Release 11)", 3GPP TS 36.101, v11.8.0, Mar. 2014, pp. 1-495.

"3rd Generation Partnership Project; Technical Specification Group Radio Access Network; Evolved Universal Terrestrial Radio Access (E-UTRA); Physical Channels and Modulation (Release 12)", 3GPP TS 36.211, v12.1.0, Mar. 2014, pp. 1-120.

"3rd Generation Partnership Project; Technical Specification Group Services and System Aspects; Service accessibility (Release 11)", 3GPP TS 22.011, v11.0.0, Jun. 2011, pp. 1-26.

* cited by examiner

Figure 1A

```
SystemInformationBlockType2 ::=         SEQUENCE {
    ac-BarringInfo                      SEQUENCE {
        ac-BarringForEmergency              BOOLEAN,
        ac-BarringForMO-Signalling          AC-BarringConfig        OPTIONAL,   -- Need OP
        ac-BarringForMO-Data                AC-BarringConfig        OPTIONAL,   -- Need OP
    }                                                               OPTIONAL,   -- Need OP
    radioResourceConfigCommon           RadioResourceConfigCommonSIB,
    ue-TimersAndConstants               UE-TimersAndConstants,
    freqInfo                            SEQUENCE {
        ul-CarrierFreq                      ARFCN-ValueEUTRA                            OPTIONAL,   -- Need OP
        ul-Bandwidth                        ENUMERATED {n6, n15, n25, n50, n75, n100}   OPTIONAL,   -- Need OP
        additionalSpectrumEmission          AdditionalSpectrumEmission
    },
    mbsfn-SubframeConfigList            MBSFN-SubframeConfigList                        OPTIONAL,   -- Need OR
    timeAlignmentTimerCommon            TimeAlignmentTimer,
    ...,
    lateNonCriticalExtension            OCTET STRING                                    OPTIONAL,   -- Need OP
    [[  ssac-BarringForMTEL-Voice-r9        AC-BarringConfig                            OPTIONAL,   -- Need OP
        ssac-BarringForMTEL-Video-r9        AC-BarringConfig                            OPTIONAL,   -- Need OP
    ]],
    [[  ac-BarringForCSFB-r10               AC-BarringConfig                            OPTIONAL    -- Need OP
    ]]
}

AC-BarringConfig ::=    SEQUENCE {
    ac-BarringFactor        ENUMERATED {
                                p00, p05, p10, p15, p20, p25, p30, p40,
                                p50, p60, p70, p75, p80, p85, p90, p95},
    ac-BarringTime          ENUMERATED {s4, s8, s16, s32, s64, s128, s256, s512},
    ac-BarringForSpecialAC  BIT STRING (SIZE(5))
}

MBSFN-SubframeConfigList ::=    SEQUENCE (SIZE (1..maxMBSFN-Allocations)) OF MBSFN-SubframeConfig
```

Figure 1B

```
MasterInformationBlock ::=         SEQUENCE {
    dl-Bandwidth                   ENUMERATED {
                                   n6, n15, n25, n50, n75, n100},
    phich-Config                   PHICH-Config,
    systemFrameNumber              BIT STRING (SIZE (8)),
    spare                          BIT STRING (SIZE (10))
}
```

DETERMINISTIC USER EQUIPMENT BARRING

RELATED APPLICATION

This application was originally filed as PCT Application No. PCT/FI2012/051256 filed Dec. 18, 2012 which claims priority benefit from U.S. Application No. 61/577,195, filed Dec. 19, 2011.

TECHNICAL FIELD

The exemplary and non-limiting embodiments of this invention relate generally to wireless communication systems, methods, devices and computer programs and, more specifically, relate to methods and apparatus to control access of user equipment in a cellular system, in particular in the radio interface, such as by the use of access class barring (ACB) in cellular systems.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
AC access class
ACB access class barring
BCH broadcast channel
BS base station
DL downlink (eNB towards UE)
EAB extended access barring
eNB E-UTRAN Node B (evolved Node B)
EPC evolved packet core
E-UTRAN evolved UTRAN (LTE)
FDMA frequency division multiple access
ID identity
IE information element
IMSI international mobile subscriber identity
IMTA international mobile telecommunications association
ITU-R international telecommunication union-radiocommunication sector
LTE long term evolution of UTRAN (E-UTRAN)
LTE-A LTE advanced
MAC medium access control (layer 2, L2)
MIB master information block
MM/MME mobility management/mobility management entity
MO mobile originated
NodeB base station
OFDMA orthogonal frequency division multiple access
O&M operations and maintenance
PDCP packet data convergence protocol
PHY physical (layer 1, L1)
Rel release
RLC radio link control
RRC radio resource control
RRM radio resource management
SFN system frame number
SGW serving gateway
SIB system information block
SC-FDMA single carrier, frequency division multiple access
TMSI temporary mobile subscriber identity
TTI transmit time interval
UE user equipment, such as a mobile station, mobile node or mobile terminal
UL uplink (UE towards eNB)
UPE user plane entity
UTRAN universal terrestrial radio access network One modern cellular communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300 V10.5.0 (2011-09) *Technical Specification* 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) incorporated by reference herein in its entirety and referred to for simplicity hereafter as 3GPP TS 36.300.

Figure 1A:
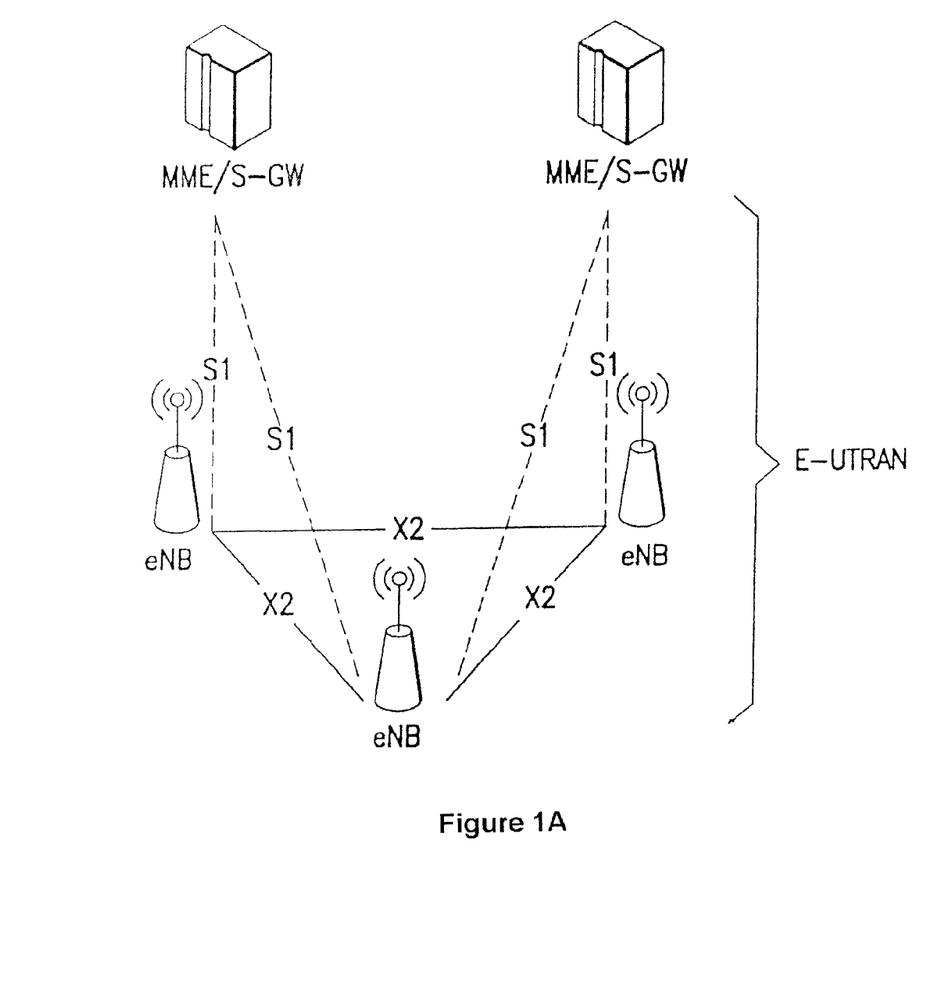
FIG. 1A reproduces FIG. 4.1 of 3GPP TS 36.300, and shows the overall architecture of the EUTRAN system.

FIG. 1A reproduces FIG. 4.1 of 3GPP TS 36.300 and shows the overall architecture of the E-UTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface. The S1 interface supports a many-to-many relationship between MMEs/S-GWs/and eNBs.

The eNB hosts the following functions:
  functions for RRM: RRC, Radio Admission Control, Connection Mobility Control, Dynamic allocation of resources to UEs in both UL and DL (scheduling);
  IP header compression and encryption of the user data stream;
  selection of a MME at UE attachment;
  routing of User Plane data towards the EPC (S-GW);
  scheduling and transmission of paging messages (originated from the MME);
  scheduling and transmission of broadcast information (originated from the MME or O&M); and
  a measurement and measurement reporting configuration for mobility and scheduling.

Also of interest herein are the further releases of 3GPP LTE (e.g., LTE Rel-10) targeted towards IMT-A systems, referred to herein for convenience simply as LTE-Advanced (LTE-A).

Reference in this regard may be made to 3GPP TR 36.913 V10.0.0 (2011-03) *Technical Report* 3rd Generation Partnership Project; Technical Specification Group Radio Access Network; Requirements for further advancements for Evolved Universal Terrestrial Radio Access (E-UTRA) (LTE-Advanced)(Release 10). Reference can also be made to 3GPP TR 36.912 V10.0.0 (2011-03) Technical Report 3rd Generation Partnership Project; Technical Specification Group Radio Access Network; Feasibility study for Further Advancements for E-UTRA (LTE-Advanced) (Release 10).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while maintaining backwards compatibility with LTE Rel-8.

In the current 3GPP LTE system the UE may belong to one of 15 different ACs (one of the ACs is reserved emergency calls i.e. AC10). AC0-AC9 are normal access classes and AC11-15 are considered as special ACs (e.g., used by an operator such as when testing a newly deployed cell, or by a government entity, etc.) The use of access class barring (ACB) makes it possible for the network to control network loading by controlling the number of UEs that can access the network during some period of time. This can be beneficial during emergency situations or at other times when a large amount of user traffic can be expected.

The barring procedure for a UE not belonging to one of the special ACs for a current call type (e.g., originating signaling or originating calls) is as follows:

A) The network broadcasts a percentage parameter (ac-BarringFactor) indication. The UE draws a random number and if the number is less than the barring factor access is allowed for that UE otherwise access is not allowed.

B) If the UE is barred then the UE starts a barring timer with "Tbarring"=(0.7+0.6*rand)*ac-BarringTime. In this case 'rand' is the random number and ac-BarringTime is a parameter broadcast by the network.

The barring procedure for a UE belonging to a special AC is as follows:

A) The UE is barred if all of the special ACs to which UE belongs are indicated as barred (with a parameter ac-BarringForSpecialAC).

In the case of the UMTS system the network broadcasts a bitmap to indicate which AC(s) is (are) barred and UE randomizes the access in the MAC layer based on a further parameter from the network. Thus in the UMTS system the network does not broadcast barring timer information.

Figure 1B:
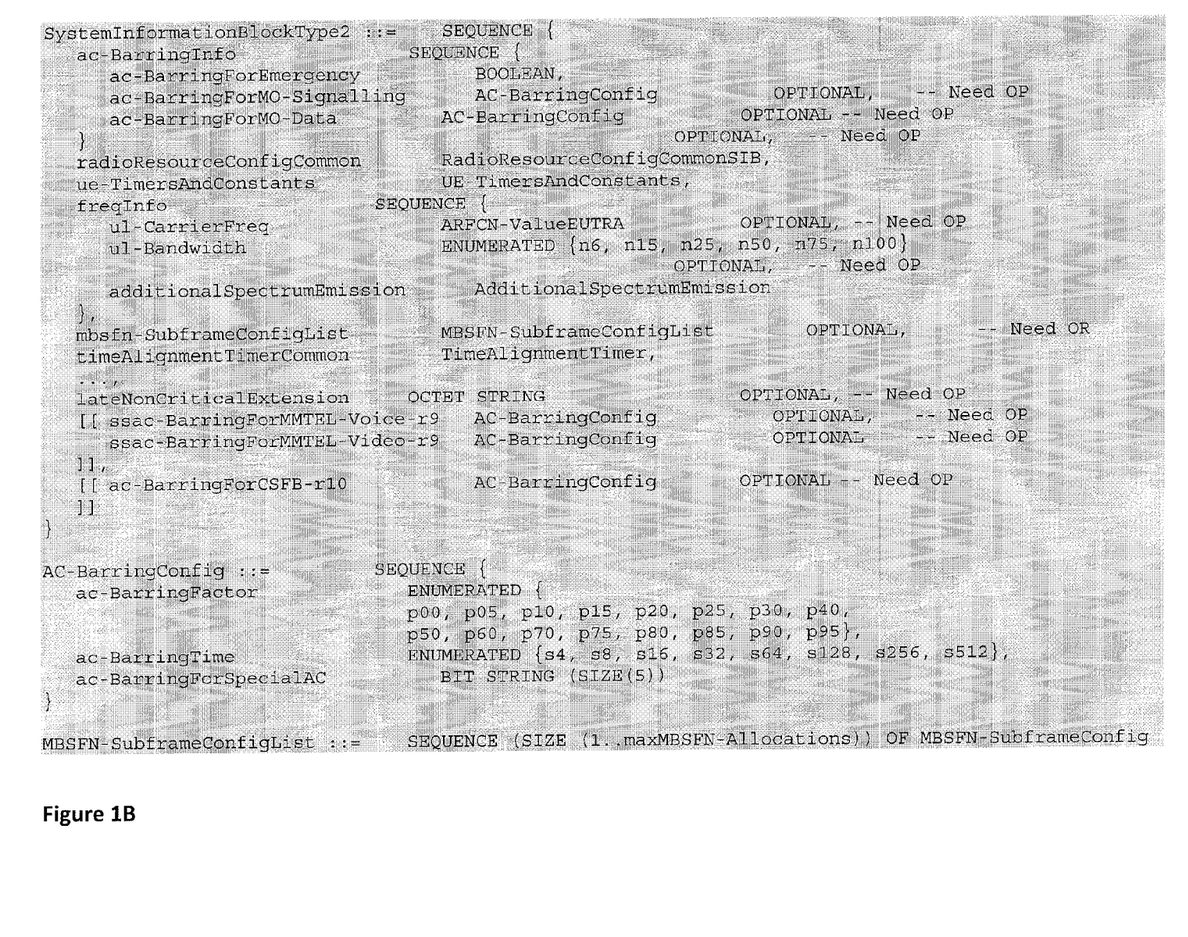
FIG. 1B reproduces a portion of Section 6.3.1 of 3GPP TS 36.331 and shows the SystemInformationBlockType2.

Reference can be made to 3GPP TS 36.331 V10.3.0 (2011-09) *Technical Specification* 3rd Generation Partnership Project; Technical Specification Group Radio Access Network; Evolved Universal Terrestrial Radio Access (E-UTRA); Radio Resource Control (RRC); Protocol specification (Release 10), such as Section 5.3.3 RRC Connection Establishment, and in particular Sections 5.3.3.2 "Initiation" and 5.3.3.11 "Access Barring Check". Also of interest is Section 6.3.1 "System Information Blocks". FIG. 1B reproduces a portion of Section 6.3.1 of 3GPP TS 36.331 and shows the SystemInformationBlockType2 and the access barring related parameters.

The information element (IE) SystemInformationBlockType2 contains radio resource configuration information that is common for all UEs. The various fields shown in FIG. 1B are defined as follows in 3GPP TS 36.331.

| SystemInformationBlockType2 field descriptions |
|---|
| ac-BarringFactor |
| If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0. |

| SystemInformationBlockType2 field descriptions |
|---|
| ac-BarringForCSFB |
| Access class barring for mobile originating CS fallback. |
| ac-BarringForEmergency |
| Access class barring for AC 10. |
| ac-BarringForMO-Data |
| Access class barring for mobile originating calls. |
| ac-BarringForMO-Signalling |
| Access class barring for mobile originating signalling. |
| ac-BarringForSpecialAC |
| Access class barring for AC 11-15. The first/leftmost bit is for AC 11, the second bit is for AC 12, and so on. |
| ac-BarringTime |
| Mean access barring time value in seconds. |
| additionalSpectrumEmission |
| The UE requirements related to IE AdditionalSpectrumEmission are defined in TS 36.101 [42, table 6.2.4.1]. |
| mbsfn-SubframeConfigList |
| Defines the subframes that are reserved for MBSFN in downlink. |
| ssac-BarringForMMTEL-Video |
| Service specific access class barring for MMTEL video originating calls. |
| ssac-BarringForMMTEL-Voice |
| Service specific access class barring for MMTEL voice originating calls. |
| ul-Bandwidth |
| Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth. |
| ul-CarrierFreq |
| For FDD: If absent, the (default) value determined from the default TX-RX frequency separation defined in TS 36.101 [42, table 5.7.3-1] applies. For TDD: This parameter is absent and it is equal to the downlink frequency. |

Figure 1C:
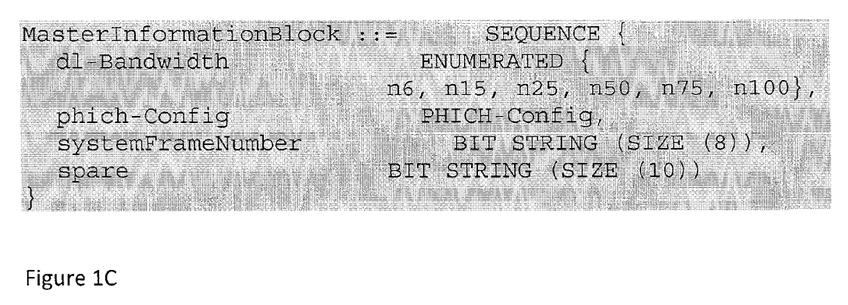
FIG. 1C shows the Master Information Block contents from 3GPP TS 36.331.

FIG. 1C shows the Master Information Block contents from 3GPP TS 36.331. The systemFrameNumber element defines the 8 most significant bits of the SFN. As indicated in 3GPP TS 36.211 the 2 least significant bits of the SFN are acquired implicitly in the P-BCH decoding, i.e., timing of 40 ms P-BCH TTI indicates 2 least significant bits (within 40 ms P-BCH TTI, the first radio frame: 00, the second radio frame: 01, the third radio frame: 10, the last radio frame: 11). One value applies for all serving cells (the associated functionality is common i.e. not performed independently for each cell).

DETAILED DESCRIPTION

It is noted at the outset that while the exemplary embodiments are described in the context of an LTE cellular system, this is but one type of wireless communication system wherein the embodiments of this invention can be used.

Currently the ACB mechanism for normal ACs (AC0-AC9) is solely based on the randomization mechanism where the UE draws a random number and the barring time is also randomized. This results in an undeterministic behavior of the UE which can be very difficult or impossible to test effectively. Additionally, for the network it is not intuitive as to how such a "randomized" method should operate.

The mechanism used for special ACs on the other hand, where no barring timer is used, would not be adequate as the number of UEs that could potentially be barred is very large, and if such a number of UEs would establish connections again simultaneously severe impacts in terms of load-balancing of network-access attempts could result. For special AC UEs such a method is acceptable as the number of those types of UEs is typically limited, but this approach would not be acceptable for normal UEs whose number would typically be much greater than the number of special AC UEs in a particular geographic area.

In the UMTS system, in order to be fair to different ACs, the network updates the SIBs periodically to bar different sets of AC(s). However the possible number SIB changes are limited to a fixed duration, and frequent ACB parameter changes will limit other content that can be conveyed by the SIB changes.

In accordance with the exemplary embodiments of this invention deterministic behavior is made possible for the UE through the use of a deterministic calculation/determination as to whether a UE is barred, and also through the use of an ability to deterministically calculate/determine for how long the UE is barred. In addition, for the network to avoid a need to change the SIB to circulate the barred UEs a rule is provided on how to circulate barred UEs when the barring timer is running.

Once the barring class (e.g., one of 10 classes) and the barring time are determined, during the barring time the UEs are barred fairly amongst the different barring classes.

Figure 2:
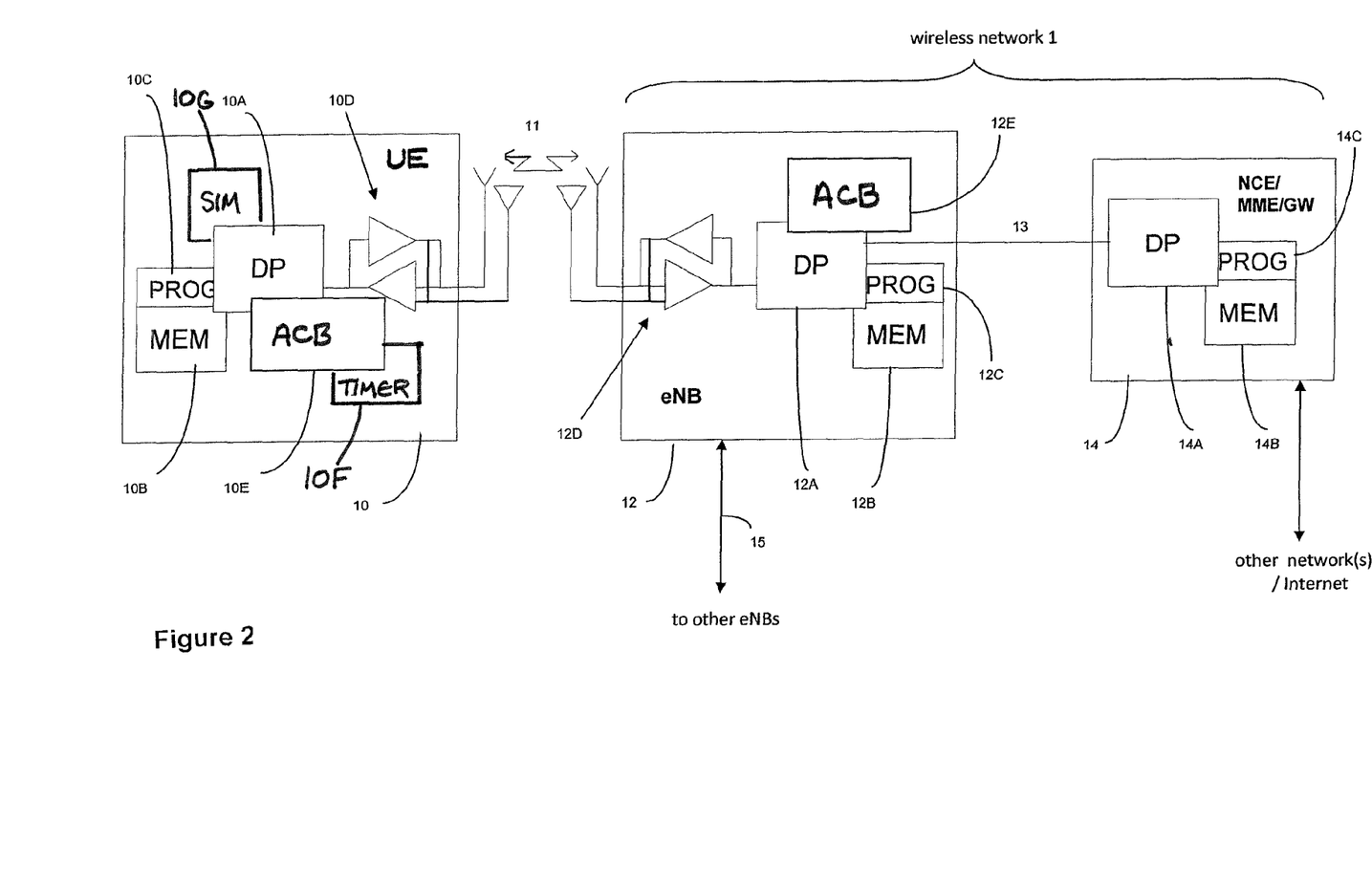
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 may be assumed to also include an ACB function or module 10E that includes a barring timer 10F, and the eNB 12 includes a complementary ACB function 12E that operates in accordance with the exemplary embodiments of this invention. The UE 10 can also include some type of subscriber identity module (SIM), such as a (U)SIM 10G.

At least one of the programs 10C and 12C is assumed to include program instructions that, when executed by the associated DP, enable the device to operate in accordance with the exemplary embodiments of this invention, as will be discussed below in greater detail. That is, the exemplary embodiments of this invention, including the ACB functions 10E and 12E, may be implemented at least in part by computer software executable by the DP 10A of the UE 10 and/or by the DP 12A of the eNB 12, or by hardware, or by a combination of software and hardware (and firmware). The ACB timer 10F can be implemented as a hardware timer or as a software timer.

The various data processors, memories, programs, transceivers and interfaces depicted in FIG. 2 can all be considered to represent means for performing operations and functions that implement the several non-limiting aspects and embodiments of this invention.

In general, the various embodiments of the UE 10 can include, but are not limited to, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

As was stated above, the exemplary embodiments of this invention are not limited for use with only the LTE (or LTE-A) types of cellular system.

A rule to calculate or determine the barring (i.e., to which barring class the UE 10 belongs) and the barring time can be based on the following (exemplary) elements:

1) Access Class
2) System Frame Number (SFN)—In all formulas the SFN means the SFN when the UE 10 received or applied the ACB parameter. Thus if the SFN is used to determine which barring class the UE 10 belongs, the end results will be different per UE. In general, as the UEs 10 receive barring parameter at different points in time or apply the barring parameter at different points in time, the SFN which each UE 10 uses will be different per UE.

In the LTE system the SFN has a 10 ms granularity with a 10-bit length. As a result one SFN wrap-around period is 10240 ms. However, and as was noted above, the 2 least significant bits (LSBs) of the SFN are acquired implicitly in the P-BCH decoding, i.e., the timing of the 40 ms P-BCH TTI indicates 2 LSBs (within the 40 ms P-BCH TTI the first radio frame: 00, the second radio frame: 01, the third radio frame: 10, the last radio frame: 11). While the UE 10 is camped on a cell the UE is synchronized to the network at the SFN level. Therefore the SFN in the formulas below is the SFN when the UE acquired the SIB containing the ACB parameters, or when UE needs to make an RRC Connection and the ACB needs to be checked. Note also that while the formulas use the most significant bits (MSBs) of the SFN, another portion of the SFN can be used for this calculation such as the LSB of the portion of the SFN which is broadcast in the MIB.

3) IMSI
4) S-TMSI or other temporary IE.

Or any combination of the foregoing.

The UE 10 should first determine which barring class it belongs to. This can be determined by the AC (Access Class) stored in the (U)SIM 10G, or it can be based on a calculation as explained below if other than the AC is used for the barring class calculation. If the AC is used for barring class determination then AC10 is for emergency calls and AC 11-15 are special access classes. AC 0-AC9 are used as a non-limiting example in the ensuing description.

Barring Class Determination (the Group of Barred UEs to which the UE Belongs)

The Barring class to which the UE 10 belongs could be based on existing access class definitions or it can be determined (giving 10 clusters similarly to AC0-9) e.g.:

IMSI and SFN Used to Calculate Barring Class

If IMSI is used to calculate barring class, one example is as follows:

(IMSI+4 MSB of SFN) Mod 10 is the number of the barring class to which UE belongs. In this calculation, "Mod 10" is used to calculate 10 barring classes. However, and if by example 16 barring classes is more appropriate then "Mod 16" can be used.

S-TMSI and SFN Used to Calculate Barring Class

For the S-TMSI based barring the formula can be the same as the IMSI based calculation but instead of IMSI, S-TMSI is used. Also instead of S-TMSI some other UE ID can be used for the calculation such as, by example, IMEI or some other temporary or permanent ID allocated by the MME 14 or any other network element.

Barring Time Determination

If the UE 10 is barred then it needs to determine for how long the UE should follow the barring rule. Therefore the meaning of the barring time is different than the barring time defined for ACB currently in LTE. However, the same formula can be still used.

For the barring timer 10F, as explained above, the formula to calculate the barring timer could be:

"$T\text{barring}$"=$(0.7+0.6*rand)*ac$-BarringTime.

In the embodiments of this invention, and instead of using the random number (rand), it is preferred to use, for example, ((IMSI+4 MSB of SFN) Mod 100)/100. As for the barring decision, the IMSI can be replaced with some other UE ID.

Determination of Whether the Barring Class is Barred

After the barring class and barring time determinations are made (or alternatively in the simultaneous calculation), while the barring timer is running the UE 10 checks whether the group to which UE belongs is barred. Reference in this regard can be made to the Table shown in FIG. 3. Alternatively the determination whether the barring class is actually barred could be based on a calculation.

Summary of the Procedure:

(1) The UE 10 checks the AC. If the AC is AC10-AC15 the UE 10 follows legacy ACB behavior. If the AC is AC0-AC9 the UE 10 performs the process below. Note that it is also possible to define new AC handling for the special ACs as well, similarly to AC0-AC9, but this is not described here for simplicity.

(2) The UE 10 calculates a barring class, such as by using the SFN if the network has broadcast barring parameters. The time could be, e.g., the time for the UE 10 to establish the RRC connection or the time when the ACB parameters were read).

(3) The UE 10 starts the barring timer 10F based on the calculation (which is not randomized as in the conventional procedure).

(4) If the barring timer 10F is running,
 (4a) the UE checks if it is barred or not (e.g. based on the table in FIG. 3 or by calculation) without randomized behavior,
 (4b) the UE 10 follows barring rules for the barring timer duration, i.e., when the UE barring class is no longer barred (as indicated by calculation/table) the UE may start the RRC Connection establishment without recalculating barring class.

(5) If the network removes barring from the SIB, the barring timer 10F ensures that not all the UEs 10 will access the network simultaneously.

(6) If the barring timer 10F expires (or is stopped),
 (6a) if the network still broadcasts barring parameter,
  (6a1) the UE 10 restarts the RRC connection establishment when the barring timer 10F expires:
   the UE can recalculate the barring class and start again from step 2 based on barring parameters signaled at this point of time; or
   the UE continues with the same barring class and updates the barring timer 10F value with the parameters signaled at this point of time.
 (6b) If the network does not broadcast the barring parameter any longer,
  (6b1) the UE 10 establishes the RRC Connection with normal procedures (e.g., starts a random access (RA) procedure).

Alternative Summary Of Procedure (with Barring Timer Preventing the UE 10 from Accessing the System):

(1) The UE 10 checks the AC. If the AC is AC10-AC15 the UE 10 follows legacy ACB behavior. If the AC is AC0-AC9 the UE 10 performs the process below. Note that it is also possible to define new AC handling for the special ACs as well, similarly to AC0-AC9, but this is not described here for simplicity.

(2) The UE 10 calculates a barring class, such as by using the SFN if the network has broadcast barring parameters. The time could be, e.g., the time for the UE 10 to establish the RRC connection or the time when the ACB parameters were read).

(3) The UE 10 checks if it is barred (e.g., based on the table of FIG. 3 or by making a calculation) without using randomized behavior.

(3a) If the UE is barred, (3a1) the UE 10 starts the barring timer 10F based on a calculation which is not randomized.

(3a2) At the expiry of the barring timer 10F, and if the network still broadcasts the barring parameter, the UE 10 restarts the connection establishment by either:

the UE can recalculate the barring class and start again from step 2 based on barring parameters signaled at this point of time; or the UE continues with the same barring class and updates the barring timer 10F value with the parameters signaled at this point of time.

(3a3) If the network is not broadcasting the barring parameter, the UE 10 establishes RRC Connection with normal procedures (e.g. starts RA procedure), (3b) Else (3b1) the UE 10 establishes the RRC Connection with normal procedures (e.g. starts RA procedure).

To implement the exemplary embodiments of this invention either new parameters for the barring factor and barring time are added to network broadcast signaling, such as to SIB2, or the same set of parameters in the SIB as for the current ACB are reused. The RRC specification specifies how the UE 10 is to determine the barring class. For example, the Table shown in FIG. 3 can be included in the RRC specification so that the UE 10 can determine when it is barred, or a specific calculation is defined in the RRC specification for the UE 10 to determine the barring class. Also, for the barring timer 10F some explanation is provided so that the UE 10 knows how the parameter "rand" in the existing formula is calculated, as opposed to using a random number.

One non-limiting approach to implementing the exemplary embodiments of this invention is to circulate barring classes along the SFN. An 8-bit SFN value signaled in the MIB has a 40 ms granularity. If the four MSBs of the SFN in the MIB are used to calculate the barring slot for barring classes, each slot will change every 0.64 s. Note in this regard that the time to change barred classes could be different by selecting a different number of bits of the SFN for the calculation. This example is shown below. However some other portion of the SFN in the MIB can be used to calculate the barring slot for barring classes, or the barring classes per barring slot may be different than in the example shown in FIG. 3.

Figure 3:
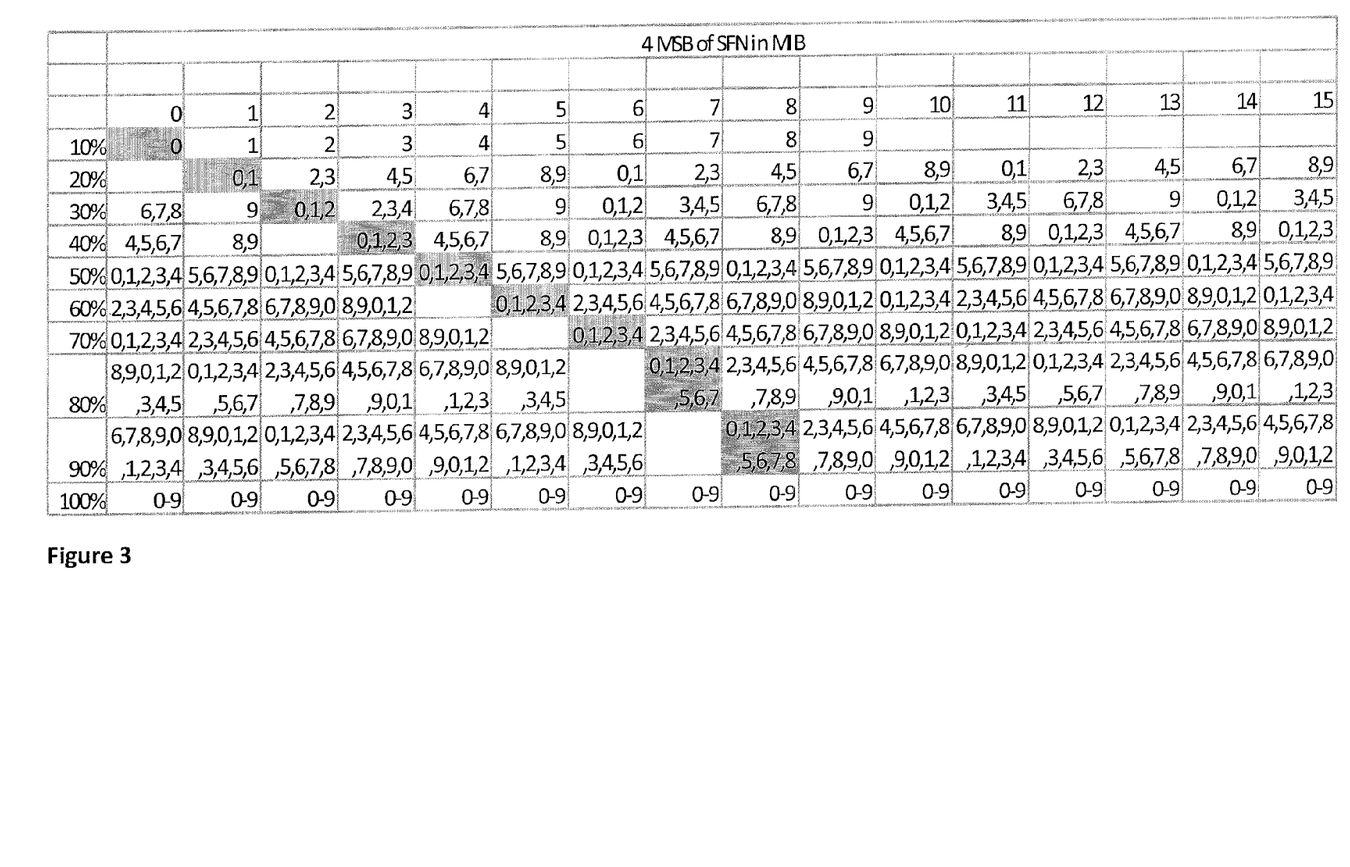
FIG. 3 shows a Table of Barring Class per 4-MSBs of the SFN in the MIB in accordance with an aspect of this invention.

The first column in the Table of FIG. 3 is the percentage of UEs to be barred which the network will broadcast. Row 3 represents the 4 bits of the SFN (e.g., 4 MSBs) from 0-15. The list of numbers in the Table indicates which barring class or classes is barred (classes 0-9). Note, for example, that for 100% barring all classes are barred. The barring classes are determined as explained above. Thus, for instance, if the 4 bits of the SFN represent '1' (i.e., '0001') with a barring percentage of 20%, barring classes 0 and 1 shall be barred.

If 4 MSBs is used to calculate the barring slot this means there will be 16 slots during one SFN wrap-around as shown in the row 3. At each barring slot 10 barring classes can be barred. This results in a total of 160 (16*10) barring occasions. If 10 percent of the UEs 10 should be barred this implies that 16 occasions out of 160 barring occasions should be barred. For fairness reasons these 16 barring occasions can be distributed evenly to different barring classes. Thus either 10 occasions are barred and one barring class is barred per occasion as in the Table 1, or 20 occasions are barred and each barring class is barred twice during the SFN wrap-around. Note that this is not exactly 10 percent of the barring but so long as the network can expect correct UE 10 behavior no problem is presented. Or alternatively, to bar exactly 10 percent of the UEs, 10 barring classed can be barred once and 6 selective barring classes can be barred once more during SFN wrap-around by scarifying the fairness. For the example of 20% barring, 32 occasions out of 160 occasions should be barred and approximately 30 occasions can be barred. (i.e., each barring class is barred 3 times during SFN wrap-around.) Further calculations are shown below:

30%: 48 occasions=>50 occasions (5 times per each barring class)

40%: 64 occasions=>60 occasions (6 times per each barring class)

50%: 80 occasions=>80 occasions (8 times per each barring class)

60%: 96 occasions=>100 occasions (10 times per each barring class)

70%: 112 occasions=>110 occasions (11 times per each barring class)

80%: 128 occasions=>130 occasions (13 times per each barring class)

90%: 144 occasions=>140 occasions (14 times per each barring class) or 150 (15 times per each barring class)

100%: 160 occasions=>160 occasions (16 times per each barring class)

In the description of the embodiments of this invention an example of using only 4 MSBs of SFN has been used. However, the number of MSBs could be some other value, e.g., 5 MSBs. In addition, and as was noted above, some set of bits, other than MSBs, of the SFN can be used to calculate the barring slot. In the example of using 5 MSBs of the SFN the barring slot will be 0.32 seconds and third row of the Table will have 32 values (0 . . . 31) instead of the 16 values (0 . . . 15) that are shown in FIG. 3. The total number of barring occasion is 320. Some related calculations for this case of 5 MSBs of the SFN are shown below:

10%: 32 occasions=>30 occasions (3 times per each barring class)

20%: 64 occasions=>60 occasions (6 times per each barring class) or 70 (7 times per each barring class)

30%: 96 occasions=>90 occasions (9 times per each barring class) or 100 (10 times per each barring class)

90%: 288 occasions=>290 occasions (29 times per each barring class)

100%: 320 occasions=>320 occasions (32 times per each barring class)

The UE 10 will follow the above barring rule as long as barring timer 10F is running, as calculated above.

The Table of FIG. 3 shows a 10% granularity of the percentage of barred UEs. However, in a case where the barring is to support, for example, a 5% granularity, the barring occasions can be calculated as shown above and correct amount of barring class per barring slot can be determined as the length of barring slot (i.e., the length of slot where one cluster of barring classes is barred.)

In addition, the list of barring classes can be different as long as the amount of barring occasions is correct according to the barring percentage signaled from the network.

While one could consider also longer wrap around period, then additional bits of the SFN would be needed to determine the correct length of the barring.

Note that a similar behavior as defined in the Table of FIG. 3 can be achieved by using an equation which indicates whether the UE 10 is barred or not. That is, the barring determination could be made algorithmically instead of using the table lookup procedure.

In a case where EAB (Extended Access Barring) is considered, the UE 10 can apply ACB if the UE passes EAB. Therefore, if the UE uses the same barring class for EAB and ACB, and the same rule (i.e., the same table) for the barring slot determination, there may be some correlation between the result of an EAB check and an ACB check. To avoid this situation a different barring class can be used for ACB and for EAB. For example, the barring class for ACB can be determined by AC and the barring class for EAB can be determined by IMSI+SFN. In this manner the result of the ACB check and the EAB check can be made more independent of one another.

Reference with respect to EAB can be made, for example, to 3GPP TS 22.011 V11.1.0 (2011-09) *Technical Specification 3$^{th}$ Generation Partnership Project; Technical Specification Group Services and System Aspects; Service accessibility* (Release 11), Section 4.3.4 "Extended Access Barring" (3 GPP TS 22.011 V11.1.0 is attached hereto as Exhibit A and incorporated by reference herein). Briefly, EAB is a mechanism for the operator(s) to control Mobile Originating access attempts from UEs that are configured for EAB in order to prevent overload of the access network and/or the core network. In congestion situations, the operator can restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs in a specific area. Reference can also be made to Section 4.3.1, "Access Class Barring".

There are a number of advantages that can be gained from the use of the exemplary embodiments of this invention. For example, the UE needing to draw a random number is replaced with a deterministic calculation and, as a result, the UE test is facilitated and the network can expect more deterministic behavior. Furthermore, the barred UEs 10 are automatically circulated in time, and the network does not need to change the SIB contents in order to change a cluster of barred UEs.

Based on the foregoing it should be apparent that the exemplary embodiments of this invention provide a method, apparatus and computer program(s) to facilitate the use of access class barring in a wireless communication network.

It should be appreciated that the description of the exemplary embodiments of this invention presented thus far should not be construed in a limiting sense as to the various manners in which the invention can be implemented. For example, the invention is not limited to the sending of barring-related parameters in a SIB, such as SIB2, as the parameters could be sent using other types of broadcast signaling. The barring-related parameters could also be sent using non-broadcast signaling, such as by using RRC signaling. Alternatively the barring-related parameters could be sent using a combination of broadcast and non-broadcast signaling.

Additionally, and as was shown above, the invention is not limited for use with any specific number of SFN bits, or with any specific type of UE identification information (e.g., the invention is not limited for use with only the IMSI or only with the S-TMSI). In addition, the various calculations discussed above are also exemplary, as other calculations could be used as well to achieve the same result(s). This being the case, the ensuing discussion of FIG. 4 is not intended to be limiting with respect to the various embodiments, implementations, forms and manifestations that this invention can assume.

Figure 4:
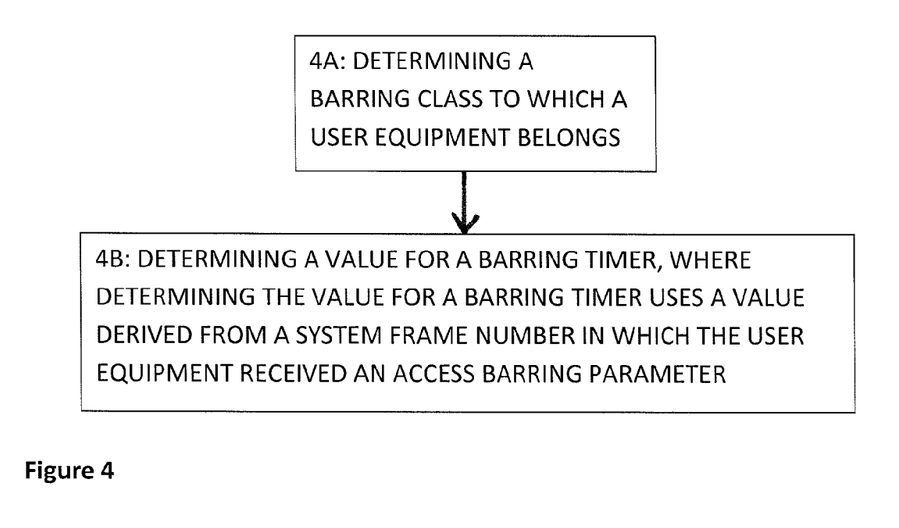
FIG. 4 is a logic flow diagram that illustrates the operation of a method, and a result of execution of computer program instructions embodied on a computer readable medium, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of determining a barring class to which a user equipment belongs. At Block 4B there is a step of determining a value for a barring timer, where determining the value for a barring timer uses a value derived from a system frame number (SFN) in which the user equipment received an access barring parameter.

(A) In the method of FIG. 4, further comprising initializing the barring timer to the determined value, starting the barring timer and determining, while the barring timer is running, whether a group of user equipment to which the user equipment belongs is barred.

(B) In the method of FIG. 4, further comprising determining whether a group of user equipment to which the user equipment belongs is barred and, if the user equipment is barred, initializing the barring timer to the determined value and starting the barring timer.

(C) In the method of FIG. 4 and either of paragraphs (A) or (B), where determining the barring class uses a network identifier (NI) of the user equipment in conjunction with the SFN.

(D) In the method of the preceding paragraph where determining the barring class is accomplished by the formula: (NI+n-bits of the SFN) Mod m, where m is a total number of barring classes other than special barring classes.

(E) In the method of the preceding paragraph where n is the four most significant bits of the SFN, or is four consecutive bits other than the most significant bits of the SFN.

(F) In the method of FIG. 4 and the paragraph (D), where determining a value for the barring timer is accomplished by the formula: (0.7+0.6 times ((NI+n-bits of the SFN) Mod 100)/100) times ac-BarringTime), where ac-BarringTime is a value received in broadcast signaling from the network.

(G) In the method of the preceding paragraph where n is the four most significant bits of the SFN, or is four consecutive bits other than the most significant bits of the SFN, and where ac-BarringTime is received in a SystemInformationBlock2 (SIB2).

(H) In the method of FIG. 4 and any of the preceding paragraphs, where determining if the user equipment is barred comprises consulting a table having a number of columns corresponding to n-bits of the SFN and a number of rows corresponding to k different percentages of barred user equipment, and locating in a pertinent row and column an identity of those barring classes that are currently access barred.

(I) In the method of the preceding paragraph, where k is equal to 10 corresponding to values of 10%, 20%, 30%, . . . , 90%, 100%.

The various blocks shown in FIG. 4 may be viewed as method steps, and/or as operations that result from operation of computer program code, and/or as a plurality of coupled logic circuit elements constructed to carry out the associated function(s). As was stated above, the specific embodiments mentioned with respect to FIG. 4 should not be construed as being limiting in any manner with respect to how this invention may be implemented.

The embodiments of this invention thus also encompass a non-transitory computer-readable medium that contains software program instructions, where execution of the software program instructions by at least one data processor results in performance of operations that comprise execution of the method of FIG. 4 and preceding paragraph (A)-(I).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, the embodiments of this invention also encompass an apparatus that comprises at least one data processor and at least one memory including computer program code. The at least one memory and computer program code are configured, with the at least one data processor, to cause the apparatus at least to determine a barring class to which a user equipment belongs, and to determine a value for a barring timer using a value derived from a system frame number (SFN) in which the user equipment received an access barring parameter.

The embodiments of this invention also encompass an apparatus that comprises first means for determining a barring class to which a user equipment belongs and second means for determining a value for a barring timer, where said second means uses a value derived from a system frame number (SFN) in which the user equipment received an access barring parameter.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, base-band circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN LTE and LTE-A systems, it should be appreciated that the exemplary embodiments of this invention are not limited for use with only these particular types of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the formulas and expressions that use these various parameters may differ from those expressly disclosed herein. Further, the various names assigned to different channels (e.g., BCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method, comprising:
receiving, at a user equipment, an access barring parameter from a network;
determining, by the user equipment, a barring class to which the user equipment belongs;
determining, by the user equipment, a value for a barring timer, wherein the determining of the value for the barring timer uses a value derived from a system frame number in which the user equipment received the access barring parameter; and
establishing, by the user equipment, a connection with the network based at least in part on the barring class and the barring timer.

2. The method according to claim 1, further comprising initializing the barring timer to the determined value, starting the barring timer and determining, while the barring timer is running, whether a group of user equipment to which the user equipment belongs is barred.

3. The method according to claim 1, further comprising determining whether a group of user equipment to which the user equipment belongs is barred and, if the user equipment is barred, initializing the barring timer to the determined value and starting the barring timer.

4. The method according to claim 3, wherein the determining of the barring class uses a network identifier of the user equipment in conjunction with the system frame number.

5. The method according to claim 4, wherein the determining of the barring class is in accordance with the following: (network identifier+n-bits of the system frame number) Mod m, wherein m is a total number of barring classes other than special barring classes.

6. The method according to claim 5, wherein n is the four most significant bits of the system frame number, or is four consecutive bits other than the most significant bits of the system frame number.

7. The method according to claim 5, wherein the determining of the value for the barring timer is in accordance to the following: (0.7+0.6 times ((network identifier+n-bits of the system frame number) Mod 100)/100) times ac-BarringTime), where ac-BarringTime is a value received in broadcast signaling from the network.

8. The method according to claim 7, wherein n is the four most significant bits of the system frame number, or is four consecutive bits other than the most significant bits of the system frame number, and where ac-BarringTime is received in a SystemInformationBlock2, SIB2.

9. The method according to claim 1, wherein the determining of whether the user equipment is barred comprises consulting a table having a number of columns corresponding to n-bits of the system frame number and a number of rows corresponding to k different percentages of barred user equipment, and locating in a pertinent row and column an identity of those barring classes that are currently access barred.

10. The method according to claim 9, wherein k is equal to 10 corresponding to values of 10%, 20%, 30%, 90%, 100%.

11. An apparatus, comprising at least one data processor and at least one memory including computer program code, the at least one memory and computer program code being configured, with the at least one data processor, to cause the apparatus at least to:
receive an access parameter from a network;
determine a barring class to which the apparatus belongs;
determine a value for a barring timer, wherein the determining of the value for the barring timer uses a value derived from a system frame number in which the apparatus received the access barring parameter; and
establish a connection with the network based at least in part on the barring class and the barring timer.

12. The apparatus according to claim 11, wherein the apparatus is further caused to at least initialize the barring timer to the determined value, start the barring timer and determine, while the barring timer is running, whether a group of user equipment to which the user equipment belongs is barred.

13. The apparatus according to claim 11, wherein the apparatus is further caused to at least determine whether a group of user equipment to which the user equipment belongs is barred and, if the user equipment is barred, initialize the barring timer to the determined value and starting the barring timer.

14. The apparatus according to claim 13, wherein the determining of the barring class uses a network identifier of the user equipment in conjunction with the system frame number.

15. The apparatus according to claim 11, wherein the determining of whether the user equipment is barred comprises consulting a table having a number of columns corresponding to n-bits of the system frame number and a number of rows corresponding to k different percentages of barred user equipment, and locating in a pertinent row and column an identity of those barring classes that are currently access barred.

16. The apparatus according to claim 15, wherein k is equal to 10 corresponding to values of 10%, 20%, 30%, 90%, 100%.

17. A computer program product comprising a non-transitory memory medium storing computer instructions, which when executed causes operations comprising:
receiving, at a user equipment, an access barring parameter from a network;
determining, by the user equipment, a barring class to which the user equipment belongs
determining, by the user equipment, a value for a barring timer, wherein the determining of the value for the barring timer uses a value derived from a system frame number in which the user equipment received the access barring parameter; and
establishing, by the user equipment, a connection with the network based at least in part on the barring class and the barring timer.

18. The method according to claim 1, wherein the user equipment establishes a connection with the network when the barring class is not barred by the network and/or at an expiration of the barring timer.

* * * * *